United States Patent
Perez et al.

(10) Patent No.: US 12,338,316 B2
(45) Date of Patent: Jun. 24, 2025

(54) COMPOSITIONS COMPRISING CYCLIC OLEFINS AND THERMALLY CONDUCTIVE FILLER

(71) Applicant: 3M INNOVATIVE PROPERTIES COMPANY, St. Paul, MN (US)

(72) Inventors: Mario A. Perez, Burnsville, MN (US); Li Yao, Woodbury, MN (US); Eumi Pyun, St. Paul, MN (US); Binhong Lin, Woodbury, MN (US); Michael A. Kropp, Cottage Grove, MN (US); Kalc C. Vang, Oakdale, MN (US); Matthew J. Kryger, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 606 days.

(21) Appl. No.: 17/762,498

(22) PCT Filed: Oct. 2, 2020

(86) PCT No.: PCT/IB2020/059215
§ 371 (c)(1),
(2) Date: Mar. 22, 2022

(87) PCT Pub. No.: WO2021/074734
PCT Pub. Date: Apr. 22, 2021

(65) Prior Publication Data
US 2023/0012969 A1    Jan. 19, 2023

Related U.S. Application Data

(60) Provisional application No. 62/914,683, filed on Oct. 14, 2019.

(51) Int. Cl.
C08G 61/08         (2006.01)
C08K 3/38          (2006.01)
H01M 50/193        (2021.01)

(52) U.S. Cl.
CPC ............ C08G 61/08 (2013.01); C08K 3/38 (2013.01); H01M 50/193 (2021.01); C08G 2170/00 (2013.01); C08G 2261/418 (2013.01); C08K 2003/385 (2013.01); C08K 2201/001 (2013.01); C08K 2201/005 (2013.01)

(58) Field of Classification Search
CPC ........ C08G 61/08; C08K 3/38; H01M 50/193
See application file for complete search history.

(56) References Cited

U.S. PATENT DOCUMENTS

| | | |
|---|---|---|
| 780,355 A | 1/1905 | Kelly et al. |
| 3,708,296 A | 1/1973 | Schlesinger |
| 3,857,825 A | 12/1974 | Streck et al. |
| 4,069,055 A | 1/1978 | Crivello |
| 4,216,288 A | 8/1980 | Crivello |
| 4,250,311 A | 2/1981 | Crivello |
| 4,330,590 A | 5/1982 | Vesley |
| 4,412,038 A | 10/1983 | Zerpner et al. |
| 5,084,586 A | 1/1992 | Farooq |
| 5,124,417 A | 6/1992 | Farooq |
| 5,312,940 A | 5/1994 | Grubbs et al. |
| 5,506,279 A | 4/1996 | Babu et al. |
| 5,536,561 A | 7/1996 | Turi et al. |
| 5,554,664 A | 9/1996 | Lamanna et al. |
| 5,753,721 A | 5/1998 | Hafner et al. |
| 5,854,299 A | 12/1998 | Muhlebach et al. |
| 5,861,443 A | 1/1999 | Hafner et al. |
| 5,902,836 A | 5/1999 | Bennett et al. |
| 5,922,802 A | 7/1999 | Setiabudi |
| 5,939,496 A | 8/1999 | Ungefug et al. |
| 5,963,731 A | 10/1999 | Sagawa et al. |
| 5,976,690 A | 11/1999 | Williams et al. |
| 6,107,420 A | 8/2000 | Grubbs et al. |
| 6,162,883 A | 12/2000 | Muhlebach et al. |
| 6,235,856 B1 | 5/2001 | Hafner et al. |
| 6,281,307 B1 | 8/2001 | Muhlebach et al. |
| 6,323,295 B1 | 11/2001 | Muhlebach et al. |
| 6,407,190 B1 | 6/2002 | Van Der Schaaf et al. |
| 6,465,554 B1 | 10/2002 | Van Der Schaaf et al. |
| 6,525,125 B1 | 2/2003 | Giardello et al. |
| 6,627,384 B1 | 9/2003 | Kim et al. |

(Continued)

FOREIGN PATENT DOCUMENTS

| CA | 2242060 A1 | 1/1999 |
|---|---|---|
| CA | 2839757 C | 1/2021 |

(Continued)

OTHER PUBLICATIONS

Machine translation of Beisele (EP 0 824 125). (Year: 1998).*
Nabaltec APRYAL 4 Product Data Sheet. (undated).*
Nippon Light Metal Company, High Purity Aluminum Hydroxide BHP39 Product Data Sheet (2017). (Year: 2017).*
"Phenolic Resins", Kirk-Othmer, Encyclopedia Of Chemical Technology, Fourth Edition, John Wiley and Sons, 1996, vol. 18, pp. 603-644.
Carlson, "The Metathesis-Facilitated Synthesis of Terminal Ruthenium Carbide Complexes: A Unique Carbon Atom Transfer Reaction", Journal of the American Chemical Society, Feb. 27, 2002, vol. 124, No. 8, pp. 1580-1581.

(Continued)

Primary Examiner — Catherine S Branch
(74) Attorney, Agent, or Firm — Carolyn A. Fischer

(57) ABSTRACT

A composition is described comprising a cyclic olefin; a ring opening metathesis polymerization catalyst; and at least 40 wt. % of thermally conductive particles. The thermally conductive particles are selected such that the composition after curing has a thermal conductivity of at least 1W/M*K. In one embodiment, the thermally conductive particle comprises a combination of smaller and larger thermally conductive particles. In another embodiment, the thermally conductive particles comprise boron nitride particles. Also described are (e.g. structural) adhesives, methods of bonding and articles.

15 Claims, No Drawings

(56) References Cited

U.S. PATENT DOCUMENTS

| | | | |
|---|---|---|---|
| 6,800,170 B2 * | 10/2004 | Kendall | C09J 165/00 427/508 |
| 6,872,792 B2 | 3/2005 | Kendall et al. | |
| 6,973,949 B1 | 12/2005 | Tokas et al. | |
| 7,025,851 B2 | 4/2006 | Caster et al. | |
| 7,365,140 B2 | 4/2008 | Piers et al. | |
| 7,514,202 B2 | 4/2009 | Ohsawa et al. | |
| 7,538,172 B2 | 5/2009 | Moszner et al. | |
| 7,820,355 B2 | 10/2010 | Kurakata | |
| 8,278,449 B2 | 10/2012 | Khosravi et al. | |
| 8,703,888 B2 | 4/2014 | Drozdzak et al. | |
| 8,722,828 B2 | 5/2014 | Sugawara | |
| 8,981,024 B2 | 3/2015 | Slugovc et al. | |
| 9,207,532 B2 | 12/2015 | Weitekamp et al. | |
| 9,321,832 B2 | 4/2016 | Tomlinson et al. | |
| 9,610,572 B2 | 4/2017 | Grela et al. | |
| 9,751,975 B2 | 9/2017 | Cruce et al. | |
| 9,796,889 B2 | 10/2017 | Giardello et al. | |
| 9,815,675 B1 | 11/2017 | Gray et al. | |
| 10,239,965 B2 | 3/2019 | Cruce et al. | |
| 2002/0015519 A1 | 2/2002 | Tokas et al. | |
| 2002/0053379 A1 | 5/2002 | Tokas et al. | |
| 2002/0055598 A1 | 5/2002 | Lynn et al. | |
| 2002/0153096 A1 | 10/2002 | Giardello et al. | |
| 2002/0166629 A1 | 11/2002 | Caster et al. | |
| 2002/0198356 A1 | 12/2002 | Dershem et al. | |
| 2003/0003317 A1 | 1/2003 | Chang et al. | |
| 2003/0151025 A1 | 8/2003 | Yang et al. | |
| 2004/0068036 A1 | 4/2004 | Halladay et al. | |
| 2005/0205203 A1 | 9/2005 | Chang et al. | |
| 2006/0052487 A1 | 3/2006 | Cruce et al. | |
| 2007/0112065 A1 | 5/2007 | Feng et al. | |
| 2007/0199649 A1 | 8/2007 | Sompalli et al. | |
| 2009/0218504 A1 | 9/2009 | Pelizzo et al. | |
| 2009/0227809 A1 | 9/2009 | Yang et al. | |
| 2009/0272436 A1 | 11/2009 | Cheung et al. | |
| 2010/0003432 A1 | 1/2010 | Schiffman et al. | |
| 2010/0173905 A1 | 7/2010 | Shen et al. | |
| 2011/0003905 A1 | 1/2011 | Buchmeiser et al. | |
| 2012/0058275 A1 | 3/2012 | Giardello et al. | |
| 2013/0209003 A1 | 8/2013 | Hansen et al. | |
| 2014/0035186 A1 | 2/2014 | Recher et al. | |
| 2014/0044980 A1 | 2/2014 | Schiffmann et al. | |
| 2014/0088260 A1 | 3/2014 | Giardello et al. | |
| 2014/0147688 A1 | 5/2014 | Corral et al. | |
| 2014/0329017 A1 | 11/2014 | Wang et al. | |
| 2014/0370318 A1 | 12/2014 | Stephen et al. | |
| 2015/0118188 A1 | 4/2015 | Weitekamp et al. | |
| 2015/0152283 A1 | 6/2015 | Stephen et al. | |
| 2015/0158271 A1 | 6/2015 | Hoshino et al. | |
| 2015/0165652 A1 | 6/2015 | Giardello et al. | |
| 2015/0166767 A1 | 6/2015 | Cruce et al. | |
| 2016/0226114 A1 | 8/2016 | Hartmann et al. | |
| 2016/0326304 A1 | 11/2016 | Stephen et al. | |
| 2017/0130089 A1 | 5/2017 | Stephen et al. | |
| 2017/0200995 A1 | 7/2017 | Phlegm et al. | |
| 2017/0233876 A1 | 8/2017 | Giardello et al. | |
| 2018/0019508 A1 | 1/2018 | Lee et al. | |
| 2018/0037677 A1 | 2/2018 | Cruce et al. | |
| 2018/0067393 A1 | 3/2018 | Weitekamp | |
| 2018/0237581 A1 | 8/2018 | Stephen et al. | |
| 2019/0048130 A1 | 2/2019 | Rhodes et al. | |
| 2020/0153096 A1 | 5/2020 | Henry et al. | |
| 2022/0127491 A1 | 4/2022 | Conley et al. | |

FOREIGN PATENT DOCUMENTS

| | | |
|---|---|---|
| CN | 1829771 A | 9/2006 |
| CN | 106985319 A | 7/2017 |
| CN | 109401676 A | 3/2019 |
| DE | 202006020148 U1 | 12/2007 |
| DE | 102017130504 A1 | 6/2019 |
| EP | 0 824 125 A1 | 2/1998 |
| EP | 0889107 A2 | 1/1999 |
| EP | 1 363 967 B1 | 4/2006 |
| EP | 1652885 A1 | 5/2006 |
| EP | 2 100 729 A1 | 9/2009 |
| EP | 2 540 492 A1 | 1/2013 |
| EP | 2 439 149 B1 | 7/2013 |
| EP | 3 144 140 A1 | 3/2017 |
| EP | 2982709 B1 | 6/2017 |
| EP | 3466658 A1 | 4/2019 |
| GB | 2319746 B | 5/2000 |
| JP | H 01-167168 A | 6/1989 |
| JP | H 05-262374 A | 10/1993 |
| JP | H 06-275137 A | 9/1994 |
| JP | H 06-314860 A | 11/1994 |
| JP | H 11-157233 A | 6/1999 |
| JP | 2000-336320 A | 12/2000 |
| JP | 2001-003029 A | 1/2001 |
| JP | 2001-040308 A | 2/2001 |
| JP | 2002-029181 A | 1/2002 |
| JP | 2002-219788 A | 8/2002 |
| JP | 2003-043495 A | 2/2003 |
| JP | 2003-155073 A | 5/2003 |
| JP | 2003-225977 A | 8/2003 |
| JP | 2006-027086 A | 2/2006 |
| JP | 2006-243315 A | 9/2006 |
| JP | 2007-311592 A | 11/2007 |
| JP | 2011-037274 A | 2/2011 |
| JP | 2014-051588 A | 3/2014 |
| JP | 2014-234417 A | 12/2014 |
| JP | 2015-003963 A | 1/2015 |
| JP | 2015-003964 A | 1/2015 |
| JP | 2015-003994 A | 1/2015 |
| JP | 2015-003995 A | 1/2015 |
| KR | 2002-0096479 A | 12/2002 |
| KR | 10-0864555 B1 | 10/2008 |
| WO | 1993/024321 A1 | 12/1993 |
| WO | 1998/036005 A1 | 8/1998 |
| WO | 2000/066676 A1 | 11/2000 |
| WO | 2001/067523 A1 | 9/2001 |
| WO | 2002/026858 A1 | 4/2002 |
| WO | 2008/040404 A1 | 4/2008 |
| WO | 2009/087758 A1 | 7/2009 |
| WO | 2009/092721 A1 | 7/2009 |
| WO | 2012/099882 A2 | 7/2012 |
| WO | 2012/174502 A2 | 12/2012 |
| WO | 2013/132008 A1 | 9/2013 |
| WO | 2014144634 A1 | 9/2014 |
| WO | 2015003147 A1 | 1/2015 |
| WO | 2015/106210 A1 | 7/2015 |
| WO | 2016/100101 A1 | 6/2016 |
| WO | 2016/130743 A1 | 8/2016 |
| WO | 2017134673 A1 | 8/2017 |
| WO | 2018045132 A1 | 3/2018 |
| WO | 2019/070819 A1 | 4/2019 |
| WO | 2020/123946 A1 | 6/2020 |
| WO | 2020121244 A1 | 6/2020 |
| WO | 2020250154 A1 | 12/2020 |
| WO | 2021074749 A1 | 4/2021 |
| WO | 2021124043 A1 | 6/2021 |
| WO | 2021124156 A1 | 6/2021 |
| WO | 2021202485 A1 | 10/2021 |
| WO | 2022053921 A1 | 3/2022 |
| WO | 2022101746 A1 | 5/2022 |
| WO | 2022219427 A1 | 10/2022 |

OTHER PUBLICATIONS

Cray Valley Product Guide, A Brand of Total, 2019, 16 pages.
Dietliker, "Chemistry And Technology of UV And EB Formulation For Coatings", Inks & Paints, SITA Technology, 1991, vol. III, pp. 276-298.
International Search Report for PCT International Application No. PCT/IB2020/052175, mailed on Jun. 15, 2022, 5 pages.
International Search Report for PCT International Application No. PCT/IB2020/059476, mailed on Jan. 25, 2021, 6 pages.
International Search Report for PCT International Application No. PCT/IB2020/061810, mailed on Feb. 26, 2021, 4 pages.
International Search Report for PCT International Application No. PCT/IB2020/062037, mailed on Mar. 19, 2021, 5 pages.

(56) References Cited

OTHER PUBLICATIONS

Keitz, "A Tandem Approach to Photoactivated Olefin Metathesis: Combining a Photoacid Generator with an Acid Activated Catalyst", Journal of the American Chemical Society, Feb. 2009, vol. 131, No. 6, pp. 2038-2039.

Khalimon, "Photogeneration of a Phosphonium Alkylidene Olefin Metathesis Catalyst", Organometallics, Aug. 2012, vol. 31, No. 15, pp. 5634-5637.

Kirk-Othmer, Encyclopedia of Chemical Technology, Supplement vol. 253-255, (1998).

Lin, "Compositions Comprising Cyclic Olefins and Thermally Conductive Filler and Adhesion Promoter", Application No. IB2022/052175, filed Mar. 10, 2022, 30 pages.

Mojtaba et al., "Rheological and Adhesion Properties of Acrylic Pressure-Sensitive Adhesives", Journal of Applied Science, vol. 120, (Oct. 14, 2010), pp. 411-418.

Penzel et al., "Polyacrylates", Ullman's Encyclopedia of Industrial Chemistry, (2018), 20 pages.

Product Brochure: "Find your highlight. Change your perspective with our latest innovations for Adhesives & Sealants" Evonik Industries, (Date unknown but believed to be prior to the date of the filing of the present application.), 20 pages.

Product Information: "Polyvest EP ST-E 60, Experimental Product (EP) Triethoxysilane-terminated liquid polybutadiene", A Product of Evonik, (Date unknown but believed to be prior to the date of the filing of the present application.), 3 pages.

Yao, et al., "Fluorinated Poly(meth)acrylate: Synthesis and properties", Polymer, vol. 55, Issue 24, (Nov. 2014), 15 pages.

Zhu, "Thermal conductivity of amorphous Sio2 thin film: A molecular dynamics study". Scientific Reports, Jul. 2018, Vo. 8, No. 1, pp. 1-9.

International Search Report for PCT International Application No. PCT/IB2020/059215, mailed on Jan. 20, 2021, 5 pages.

Lemcoff, "Light-induced olefin metathesis", Beilstein Journal of Organic Chemistry, 2010, vol. 6, pp. 1106-1119.

Monsaert, "Latent olefin metathesis catalysts", Chemical Society Reviews, 2009, vol. 38, pp. 3360-3372.

Product Broacher: "Martoxid TM-4000 Series", A Product of J. M. Huber Corporation, Oct. 2016, 9 pages.

Product Datasheet: "Baytec ME230", A Product of Covestro LLC, Jan. 2012, 4 pages.

Product Datasheet: "DESMODUR E 28", A Product of Covestro LLC, Oct. 2017, 2 pages.

Product Information: "Martoxid TM 2250", A Product of Martinswerk (A Huber Cmpany), Apr. 2018, 2 pages.

Product Information: "MoldX A110 Aluminum Hydroxide (ATH)", A Product of J. M. Huber Corporation, Nov. 2018, 1 page.

Product Information: "Polyvest MA 75", A Product of Evonik, Jan. 2019, 2 pages.

Product Information: "Ricon 131 Maleinized Polybutadiene", A Product of Cray Valley, Jan. 2010, 1 page.

Product Information: "Spherical Alumina", A Product of Bestry, (Date unknown but believed to be prior to the date of the filing of the present application.), 2 pages.

Technical Data Sheet: "RICON 131 Polybutadiene", A Product of Cray Valley, Jun. 2010, 1 page.

Haag, "Functionalized Polybutadiene Oils as Adhesion Promoters for Mineral Fillers in Rubber Compounds", Die Angewandte Makromolekulare Chemie—Applied Macromolecularchemistry and Physics, Aug. 1989, vol. 171, No. 1, pp. 1-19.

* cited by examiner

COMPOSITIONS COMPRISING CYCLIC OLEFINS AND THERMALLY CONDUCTIVE FILLER

BACKGROUND

Compositions with cyclic olefins and a ring opening metathesis polymerization catalyst have been described. (See for example U.S. Pat. No. 6,525,125, US 2015/0166767 and U.S. Pat. No. 10,239,965).

SUMMARY

In one embodiment, a composition is described comprising a cyclic olefin; a ring opening metathesis polymerization catalyst; and at least 40 wt. % of thermally conductive particles. The thermally conductive particles are selected such that the composition after curing has a thermal conductivity of at least 1 W/M*K.

In some embodiments, the composition comprises at least 20, 25, 30, 35, 40, 45, 50 wt. % of the thermally conductive particles having a particle size no greater than 10 microns. In some embodiments, the composition comprises at least 10 wt. % of thermally conductive particles having a particle size of at least 30, 40, or 50 microns.

In some embodiments, the thermally conductive particle comprises a combination of smaller and larger thermally conductive particles.

In other embodiments, the thermally conductive particles comprise boron nitride particles.

In some embodiments, the composition is an adhesive. The adhesive composition is typically provided in two parts, wherein the catalyst is in a separate container (e.g. chamber of two-component dispensing system) than the cyclic olefin prior to use of the composition.

In other embodiments, articles are described comprising a cured composition as described herein.

Also described is a method of bonding comprising providing a composition as described herein, applying the composition between a first and second substrate; and polymerizing the cyclic olefin. In some embodiments, the adhesive composition may be characterized as a thermoset, since the cyclic olefin is polymerized by exposure to heat.

DETAILED DESCRIPTION

The polymerizable compositions described herein comprise one or more cyclic olefins. The cyclic olefins are generally mono-unsaturated (i.e. mono-olefin) or poly-unsaturated (i.e. comprising two or more carbon-carbon double bonds or in otherwords alkene groups). The double bond or in otherwords ethylenic unsaturation is not part of a (meth) acrylate or vinyl ether group. The cyclic olefin may be mono- or poly-cyclic (i.e. comprising two or more cyclic groups). The cyclic olefin may generally be a strained or unstrained cyclic olefin, provided the cyclic olefin is able to participate in a ROMP reaction either individually or as part of a ROMP cyclic olefin composition.

The polymerizable composition comprise cyclic diene monomers, including for example 1,3-cyclopentadiene, 1,3-cyclohexadiene, 1,4-cyclohexadiene, 5-ethyl-1,3-cyclohexadiene, 1,3-cycloheptadiene, cyclohexadiene, 1,5-cyclooctadiene, 1,3-cyclooctadiene, norbornadiene, cyclohexenylnorbornene, including oligomers thereof such as trimers, tetramers, pentamers, etc. The polyolefin cyclic materials are amenable to thermosetting.

In some embodiments, the polymerizable composition comprises dicyclopentadiene (DCPD), depicted as follows:

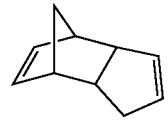

Various DCPD suppliers and purities may be used such as Lyondell 108 (94.6% purity), Veliscol UHP (99+% purity), Cymatech Ultrene (97% and 99% purities), and Hitachi (99+% purity).

In some embodiments, the composition comprises cyclopentadiene oligomers including trimers, tetramers, pentamers, and the like; depicted as follows:

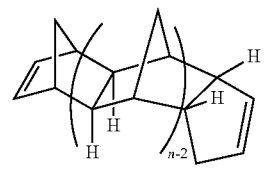

cyclopentadiene oligomers, n is typically 3, 4 or 5.

In some embodiments, the composition comprises cyclic diene monomer in the absence of mono-olefins.

In other embodiments, the composition further comprises a cyclic mono-olefin. Examples include cyclopentene, cyclohexene, cycloheptene, cyclooctene, cyclononene, cyclodecene, cycloundecene, cyclododecene, tricyclodecene, tetracyclodecene, octacyclodecene, and cycloeicosene, and substituted versions thereof such as 1-methylcyclopentene, 1-ethylcyclopentene, 1-isopropylcyclohexene, 1-chloropentene, 1-fluorocyclopentene, 4-methylcyclopentene, 4-methoxy-cyclopentene, 4-ethoxy-cyclopentene, cyclopent-3-ene-thiol, cyclopent-3-ene, 4-methylsulfanyl-cyclopentene, 3-methylcyclohexene, 1-methylcyclooctene, 1,5-dimethylcyclooctene, etc.

In some embodiments, the composition further comprises norbornene, depicted as follows:

Suitable norbornene monomers include substituted norbornenes such as norbornene dicarboxylic anhydride (nadic anhydride); and as well as alkyl and cycloalkyl norbornenes including butyl norbornene, hexyl norbornene, octyl norbornene, decyl norbornene, and the like.

The cyclic olefin monomers and oligomers may optionally comprise substituents provided the monomer, oligomer, or mixture is suitable for metathesis reactions. The carbon atoms of the cyclic olefin moiety may optionally comprise substituents derived from radical fragments including halogens, pseudohalogens, alkyl, aryl, acyl, carboxyl, alkoxy, alkyl- and arylthiolate, amino, aminoalkyl, and the like, or in which one or more carbon atoms have been replaced by, for example, silicon, oxygen, sulfur, nitrogen, phosphorus, antimony, or boron. For example, the olefin may be substituted with one or more groups such as thiol, thioether, ketone, aldehyde, ester, ether, amine, amide, nitro, carboxylic acid, disulfide, carbonate, isocyanate, phosphate, phosphite, sulfate, sulfite, sulfonyl, carboiimide, carboalkoxy, carbamate, halogen, or pseudohalogen. Similarly, the olefin may be substituted with one or more groups such as C1-C20 alkyl, aryl, acyl, C1-C20 alkoxide, aryloxide, C3-C20 alkyldiketonate, aryldiketonate, C1-C20 carboxylate, arylsulfonate, C1-C20 alkylsulfonate, C1-C20 alkylthio, arylthio, C1-C20 alkylsulfonyl, C1-C20 alkylsulfinyl, C—C20 alkylphosphate, and arylphosphate.

Preferred cyclic olefins can include dicyclopentadiene; tricyclopentadiene; dicyclohexadiene; norbornene; 5-methyl-2-norbornene; 5-ethyl-2-norbornene; 5-isobutyl-2-norbornene; 5,6-dimethyl-2-norbornene; 5-phenylnorbornene; 5-benzylnorbornene; 5-acetylnorbornene; 5-methoxycarbonylnorbornene; 5-ethoxycarbonyl-1-norbornene; 5-methyl-5-methoxy-carbonylnorbornene; 5-cyanonorbornene; 5,5,6-trimethyl-2-norbornene; cyclo-hexenylnorbornene; endo, exo-5,6-dimethoxynorbornene; endo, endo-5,6-dimethoxynorbornene; endo, exo-5-6-dimethoxycarbonylnorbornene; endo, endo-5,6-dimethoxycarbonylnorbornene; 2,3-dimethoxynorbornene; norbornadiene; tricycloundecene; tetracyclododecene; 8-methyltetracyclododecene; 8-ethyl-tetracyclododecene; 8-methoxycarbonyltetracyclododecene; 8-methyl-8-tetracyclo-dodecene; 8-cyanotetracyclododecene; pentacyclopentadecene; pentacyclohexadecene; higher order oligomers of cyclopentadiene such as cyclopentadiene tetramer, cyclopentadiene pentamer, and the like; and $C_2$-$C_{12}$ hydrocarbyl substituted norbornenes such as 5-butyl-2-norbornene; 5-hexyl-2-norbornene; 5-octyl-2-norbornene; 5-decyl-2-norbornene; 5-dodecyl-2-norbornene; 5-vinyl-2-norbornene; 5-ethylidene-2-norbornene; 5-isopropenyl-2-norbornene; 5-propenyl-2-norbornene; and 5-butenyl-2-norbornene, and the like. More preferred cyclic olefins include dicyclopentadiene, tricyclopentadiene, and higher order oligomers of cyclopentadiene, such as cyclopentadiene tetramer, cyclopentadiene pentamer, and the like, tetracyclododecene, norbornene, and $C_2$-$C_{12}$ hydrocarbyl substituted norbornenes, such as 5-butyl-2-norbornene, 5-hexyl-2-norbornene, 5-octyl-2-norbornene, 5-decyl-2-norbornene, 5-dodecyl-2-norbornene, 5-vinyl-2-norbornene, 5-ethylidene-2-norbornene, 5-isopropenyl-2-norbornene, 5-propenyl-2-norbornene, 5-butenyl-2-norbornene, and the like.

The cyclic olefins may be used alone or mixed with each other in various combinations to adjust the properties of the olefin monomer composition. For example, mixtures of cyclopentadiene dimer and trimers offer a reduced melting point and yield cured olefin copolymers with increased mechanical strength and stiffness relative to pure polyDCPD. As another example, incorporation of norbornene, or alkyl norbornene comonomers tend to yield cured olefin copolymers that are relatively soft and rubbery.

In some embodiments, the cyclic olefin material comprises a mixture of DCPD monomer and cyclopentadiene oligomer. In some embodiments, the mixture comprises at least 25, 30, 35, 40 or 45 wt. % DCPD based on the total amount a cyclic olefin monomer(s) and oligomer(s). In some embodiments, the mixture comprises no greater than 75, 70, 65, 60, 55, or 50 wt. % DCPD based on the total amount a cyclic olefin monomer(s) and oligomer(s). In some embodiments, the mixture comprises at least 15, 20, 25, 30, or 35 wt. % of cyclic olefin oligomers, such as cyclopentadiene trimer and/or tetramer based on the total amount a cyclic olefin monomer(s) and oligomer(s). In some embodiments, the mixture comprises no greater than 60, 55, 50, 45, or 40 wt. % of cyclic olefin oligomers, such as cyclopentadiene trimer and/or tetramer based on the total amount a cyclic olefin monomer(s) and oligomer(s). In some embodiments, the mixture comprises at least 2, 3, 4, or 5 wt. % of cyclic olefin oligomers having greater than four cyclopentadiene repeat units, such as cyclopentadiene pentamer. In some embodiments, the mixture comprises no greater than 10, 9, 8, 7, 6, or 5 wt. % of cyclic olefin oligomers having greater than four cyclopentadiene repeat units, such as cyclopentadiene pentamer.

In some embodiments, the cyclic olefin material comprises a mixture of DCPD monomer and cyclopentadiene oligomer, in the absence of mono-olefins or in combination with a low concentration of mono-olefin. In this embodiment, the amount of mono-olefin is less than 25, 20, 15, 10, 9, 8, 7, 6, 5, 4, 3, 2, or 1 wt. % based on the total amount a cyclic olefin monomer(s) and oligomer(s).

In other embodiments, the mixture comprises at least 25, 30, 35, 40 or 45 wt. % of a mono-olefin such as a substituted norbornene, based on the total amount a cyclic olefin monomer(s) and oligomer(s). In some embodiments, the mixture comprises no greater than 75, 70, 65, 60, 55, or 50 wt. % mono-olefin (e.g. C4-C12 (e.g. C8) alkyl norbornene) based on the total amount a cyclic olefin monomer(s) and oligomer(s). In some embodiments, the mixture comprises at least 15, 20, 25, 30, or 35 wt. % of cyclic olefin oligomers, such as cyclopentadiene trimer and/or tetramer based on the total amount a cyclic olefin monomer(s) and oligomer(s). In some embodiments, the mixture comprises no greater than 60, 55, 50, 45, or 40 wt. % of cyclic olefin oligomers, such as cyclopentadiene trimer and/or tetramer based on the total amount a cyclic olefin monomer(s) and oligomer(s). In some embodiments, the mixture comprises at least 2, 3, 4, or 5 wt. % of cyclic olefin oligomers having greater than four cyclopentadiene repeat units, such as cyclopentadiene pentamer. In some embodiments, the mixture comprises no greater than 10, 9, 8, 7, 6, or 5 wt. % of cyclic olefin oligomers having greater than four cyclopentadiene repeat units, such as cyclopentadiene pentamer. In some embodiments, the mixture comprises no greater than 5, 4, 3, 2, or 1 wt. % of DCPD monomer. In other embodiments, the mixture comprises no greater than 25 or 20 wt. % of DCPD monomer.

The amount of cyclic olefin (i.e. polyolefin and optional mono-olefin) is typically at least 5, 6, 7, 8, 9, or 10 wt. % of the total composition. In some embodiments, the amount of cyclic olefin is at least 11, 12, 13, 14, or 15 wt. % of the total composition. In other embodiments, the amount of cyclic olefin is at least 16, 17, 18, 19, or 20 wt. % of the total composition. The amount of cyclic olefin (i.e. polyolefin and optional mono-olefin) is typically no greater than 60 wt. % of the total composition. In some embodiments, the amount of cyclic olefin is no greater than 55, 50, 45, 40, 25, or 20 wt. % of the total composition.

The amount of cyclic olefin (i.e. polyolefin and optional mono-olefin) is typically at least 25, 26, 27, 28, 29, or 30 vol. % based on the total volume of the composition. In some embodiments, the amount of cyclic olefin (i.e. polyolefin and optional mono-olefin) is typically at least 35, 40, 45, or 50 vol. % based on the total volume of the composition. The amount of cyclic olefin (i.e. polyolefin and optional mono-olefin) is typically no greater than 75, 74, 73, 72, 71, or 70 vol. % based on the total volume of the composition. In some embodiments, the amount of cyclic olefin (i.e. polyolefin and optional mono-olefin) is no greater than 65 or 60 vol. % based on the total volume of the composition.

Various cyclic olefins are commercially available from Materia.

The compositions described herein are typically prepared by the metathesis of cyclic olefins polymerized with a metal carbene catalyst. Group 8 transition metals, such as ruthenium and osmium, carbene compounds have been described as effective catalysts for ring opening metathesis polymerization (ROMP). See for example U.S. Pat. No. 10,239,965; incorporated herein by reference.

In typical embodiments, the catalyst is a metal carbene olefin metathesis catalyst. Such catalysts typically have the following structure:

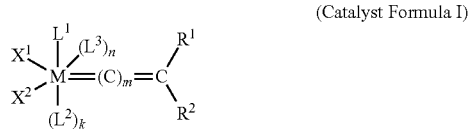

(Catalyst Formula I)

wherein
M is a Group 8 transition metal;
$L^1$, $L^2$, and $L^3$ are independently neutral electron donor ligands;
n is 0 or 1;
m is 0, 1, or 2;
k is 0 or 1;
$X^1$ and $X^2$ are independently anionic ligands; and
$R^1$ and $R^2$ are independently selected from hydrogen, hydrocarbyl, substituted hydrocarbyl, heteroatom-containing hydrocarbyl, substituted heteroatom-containing hydrocarbyl, and functional groups.

Typical metal carbene olefin metathesis catalysts contain Ru or Os as the Group 8 transition metal, with Ru being preferred.

A first group of metal carbene olefin metathesis catalysts, then, are commonly referred to as First Generation Grubbs-type catalysts, and have the structure of formula (I). For the first group of metal carbene olefin metathesis catalysts, M is a Group 8 transition metal, m is 0, 1, or 2, and n, $X^1$, $X^2$, $L^1$, $L^2$, and $L^3$ are described as follows.

For the first group of metal carbene olefin metathesis catalysts, n is 0, and $L^1$ and $L^2$ are independently selected from phosphine, sulfonated phosphine, phosphite, phosphinite, phosphonite, arsine, stibine, ether, (including cyclic ethers), amine, amide, imine, sulfoxide, carboxyl, nitrosyl, pyridine, substituted pyridine, imidazole, substituted imidazole, pyrazine, substituted pyrazine and thioether. Exemplary ligands are trisubstituted phosphines. Typical trisubstituted phosphines are of the formula $PR^{H1}R^{H2}R^{H3}$, where $R^{H1}$, $R^{H2}$, and $R^{H3}$ are each independently substituted or unsubstituted aryl or C1-C10 alkyl, particularly primary alkyl, secondary alkyl, or cycloalkyl. In some embodiments, $L^1$ and $L^2$ are independently selected from the group consisting of trimethylphosphine (PMe₃), triethylphosphine (PEt₃), tri-n-butylphosphine (PBu₃), tri(ortho-tolyl)phosphine (P-o-tolyl₃), tri-tert-butvlphosphine (P-tert-Bu₃), tricyclopentylphosphine (PCyclopentyl₃), tricyclohexylphosphine (PCy₃), triisopropylphosphine (P-i-Pr₃), trioctylphosphine (POct₃), triisobutylphosphine, (P-i-Bu₃), triphenylphosphine (PPh₃), tri(pentafluorophenyl)phosphine (P(C₆F₅)₃), methyldiphenylphosphine (PMePh₂), dimethylphenylphosphine (PMe₂Ph), and diethylphenylphosphine (PEt₂Ph). Alternatively, $L^1$ and $L^2$ may be independently selected from phosphabicycloalkane (e.g., monosubstituted 9-phosphabicyclo-[3.3.1]nonane, or monosubstituted 9-phosphabicyclo[4.2.1]nonane] such as cyclohexylphoban, isopropylphoban, ethylphoban, methylphoban, butylphoban, pentylphoban and the like.

$X^1$ and $X^2$ are anionic ligands, and may be the same or different, or are linked together to form a cyclic group, typically although not necessarily a five- to eight-membered ring. In some embodiments, $X^1$ and $X^2$ are each independently hydrogen, halide, or one of the following groups: C1-C20 alkyl, C5-C24 aryl, C1-C20 alkoxy, C5-C24 aryloxy, C2-C20 alkoxycarbonyl, C6-C24 aryloxycarbonyl, C2-C24 acyl, C2-C24 acyloxy, C1-C20 alkylsulfonato, C5-C24 arylsulfonato, C1-C20 alkylsulfanyl, C5-C24 arylsulfanyl, C1-C20 alkylsulfinyl, NO₃, —N=C=O, —N=C=S, or C₅-C₂₄ arylsulfinyl. Optionally, $X^1$ and $X^2$ may be substituted with one or more moieties selected from C1-C12 alkyl, C1-C12 alkoxy, C5-C24 aryl, and halide, which may, in turn, with the exception of halide, be further substituted with one or more groups selected from halide, C1-C6 alkyl, C1-C6 alkoxy, and phenyl. In some embodiments, $X^1$ and $X^2$ are halide, benzoate, C2-C6 acyl, C2-C6 alkoxycarbonyl, C1-C6 alkyl, phenoxy, C1-C6 alkoxy, C1-C6 alkylsulfanyl, aryl, or C1-C6 alkylsulfonyl. In some preferred embodiments, $X^1$ and $X^2$ are each halide, CF₃CO₂, CH₃CO₂, CFH₂CO₂, (CH₃)₃CO, (CF₃)₂(CH₃)CO, (CF₃)(CH₃)₂CO, PhO, MeO, EtO, tosylate, mesylate, or trifluoromethane-sulfonate. In some preferred embodiments, $X^1$ and $X^2$ are each chloride.

$R^1$ and $R^2$ are independently selected from hydrogen, hydrocarbyl (e.g., C1-C20 alkyl, C2-C20 alkenyl, C2-C20 alkynyl, C5-C24 aryl, C6-C24 alkaryl, C6-C24 aralkyl, etc.), substituted hydrocarbyl (e.g., substituted C1-C20 alkyl, C2-C20 alkenyl, C2-C20 alkynyl, C5-C24 aryl, C6-C24 alkaryl, C6-C24 aralkyl, etc.), heteroatom-containing hydrocarbyl (e.g., heteroatom-containing C1-C20 alkyl, C2-C20 alkenyl, C2-C20 alkynyl, C5-C24 aryl, C6-C24 alkaryl, C6-C24 aralkyl, etc.), and substituted heteroatom-containing hydrocarbyl (e.g., substituted heteroatom-containing C1-C20 alkyl, C2-C20 alkenyl, C2-C20 alkynyl, C5-C24 aryl, C6-C24 alkaryl, C6-C24 aralkyl, etc.), and functional groups. $R^1$ and $R^2$ may also be linked to form a cyclic group, which may be aliphatic or aromatic, and may contain substituents and/or heteroatoms. Generally, such a cyclic group will contain 4 to 12, preferably 5, 6, 7, or 8 ring atoms.

In some embodiments, $R^1$ is C1-C6 alkyl, C2-C6 alkenyl, and C5-C14 aryl.

In some embodiments, $R^2$ is phenyl, vinyl, methyl, isopropyl, or t-butyl, optionally substituted with one or more moieties selected from C1-C6 alkyl, C1-C6 alkoxy, phenyl, and a functional group Fn. Suitable functional groups ("Fn") include phosphonato, phosphoryl, phosphanyl, phosphino, sulfonato, C1-C20 alkylsulfanyl, C5-C20 arylsulfanyl, C1-C20 alkylsulfonyl, C5-C20 arylsulfonyl, C1-C20 alkylsulfinyl, C5-C20 arylsulfinyl, sulfonamido, amino, amido, imino, nitro, nitroso, hydroxyl, C1-C20 alkoxy, C5-C20 aryloxy, C2-C20 alkoxycarbonyl, C5-C20 aryloxycarbonyl, carboxyl, carboxylato, mercapto, formyl, C1-C20 thioester, cyano, cyanato, thiocyanato, isocyanate, thioisocyanate, carbamoyl, epoxy, styrenyl, silyl, silyloxy, silanyl, siloxazanyl, boronato, boryl, or halogen, or a metal-containing or metalloid-containing group (wherein the metal may be, for example, Sn or Ge).

In some embodiments, $R^2$ is phenyl or vinyl substituted with one or more moieties selected from methyl, ethyl, chloro, bromo, iodo, fluoro, nitro, dimethylamino, methyl, methoxy, and phenyl. In some favored embodiments, $R^2$ is phenyl or —CH=C(CH₃)₂.

In some embodiments, one or both of $R^1$ and $R^2$ may have the structure $-(W)_n-U^+V^-$, wherein W is selected from hydrocarbylene, substituted hydrocarbylene, heteroatom-containing hydrocarbylene, or substituted heteroatom-containing hydrocarbylene; U is a positively charged Group 15 or Group 16 element substituted with hydrogen, hydrocarbyl, substituted hydrocarbyl, heteroatom-containing hydrocarbyl, or substituted heteroatom-containing hydrocarbyl; V is a negatively charged counterion; and n is zero or 1. Furthermore, $R^1$ and $R^2$ may be taken together to form an indenylidene moiety, such as phenylindenylidene.

In some embodiments, any one or more of $X^1$, $X^2$, $L^1$, $L^2$, $L^3$, $R^1$ and $R^2$ may be attached to a support or two or more (e.g. three or four) of said groups can be bonded to one another to form one or more cyclic groups, including bidentate or multidentate ligands, as disclosed, for example, in U.S. Pat. No. 5,312,940, incorporated herein by reference. When two or more of $X^1$, $X^2$, $L^1$, $L^2$, $L^3$ $R^1$ and $R^2$ are linked to form cyclic groups, those cyclic groups may contain 4 to 12, preferably 4, 5, 6, 7 or 8 atoms, or may comprise two or three of such rings, which may be either fused or linked. The cyclic groups may be aliphatic or aromatic, and may be heteroatom-containing and/or substituted. The cyclic group may, in some cases, form a bidentate ligand or a tridentate ligand. Examples of bidentate ligands include, but are not limited to, bisphosphines, dialkoxides, alkyldiketonates, and aryldiketonates.

A second group of metal carbene olefin metathesis catalysts, commonly referred to as Second Generation Grubbs-type catalysts, have the structure of formula (I), wherein $L^1$ is a carbene ligand having the structure of formula (II)

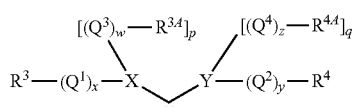

wherein M, m, n, $X^1$, $X^2$, $L^2$, $L^3$, $R^1$ and $R^2$ are as previously defined Formula I;

X and Y are heteroatoms typically selected from N, O, S, and P. Since O and S are divalent, p is necessarily zero when X is O or S, q is necessarily zero when Y is O or S, and k is zero or 1. However, when X is N or P, then p is 1, and when Y is N or P, then q is 1. In a preferred embodiment, both X and Y are N;

$Q^1$, $Q^2$, $Q^3$, and $Q^4$ are linkers, e.g., hydrocarbylene (including substituted hydrocarbylene, heteroatom-containing hydrocarbylene, and substituted heteroatom-containing hydrocarbylene, such as substituted and/or heteroatom-containing alkylene) or $-(CO)-$, and w, x, y, and z are independently zero or 1, meaning that each linker is optional. Preferably, w, x, y, and z are all zero. Further, two or more substituents of adjacent atoms within $Q^1$, $Q^2$, $Q^3$, and $Q^4$ may be linked to form an additional cyclic group;

$R^3$, $R^{3A}$, $R^4$, and $R^{4A}$ are independently selected from hydrogen, hydrocarbyl, substituted hydrocarbyl, heteroatom-containing hydrocarbyl, and substituted heteroatom-containing hydrocarbyl. In addition, X and Y may be independently selected from carbon and one of the heteroatoms mentioned above, preferably no more than one of X or Y is carbon. Also, $L^2$ and $L^3$ may be taken together to form a single bindentate electron-donating heterocyclic ligand. Furthermore, $R^1$ and $R^2$ may be taken together to form an indenylidene moiety, preferably phenylindenylidene. Moreover, $X^1$, $X^2$, $L^2$, $L^3$, X and Y may be further coordinated to boron or to a carboxylate;

Any two or more of $X^1$, $X^2$, $L^1$, $L^2$, $L^3$, $R^1$, $R^2$ $R^3$, $R^{3A}$, $R^4$, $R^{4A}$, $Q^1$, $Q^2$, $Q^3$, and $Q^4$ can be bonded to one another to form one or more cyclic groups or can also be taken to be -A-Fn, wherein "A" is a divalent hydrocarbon moiety and Fn is a functional group as previously described. Further, with the exception of $L^1$ such groups may be bonded to a support.

A particular class of such carbene are commonly referred to as N-heterocyclic carbene (NHC) ligands.

Examples of N-heterocyclic carbene (NHC) ligands and acyclic diaminocarbene ligands suitable as L1 thus include, but are not limited to, the following where DIPP or DiPP is diisopropylphenyl and Mes is 2,4,6-trimethylphenyl:

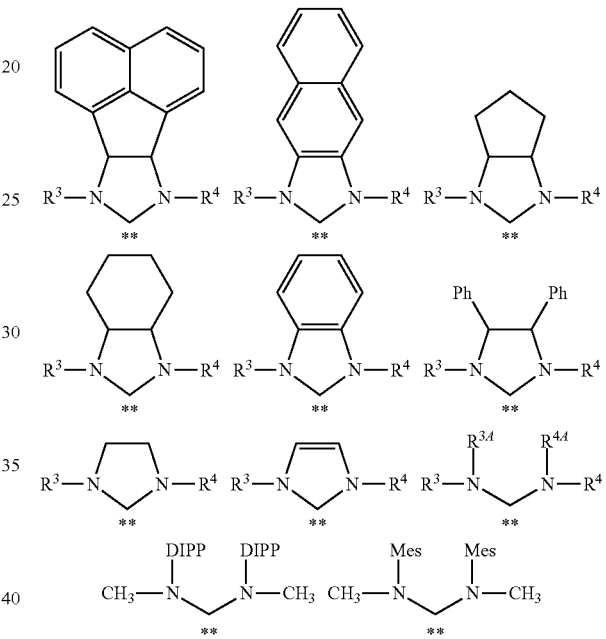

Representative metal carbene olefin metathesis catalysts include for example bis(tricyclohexylphosphine) benzylidene ruthenium dichloride, bis(tricyclohexylphosphine) dimethylvinylmethylidene ruthenium dichloride, bis(tricyclopentylphosphine) dimethylvinylmethylidene ruthenium dichloride, (tricyclohexylphosphine)(1,3-dimesityl-4,5-dihydroimidazol-2-ylidene) benzylidene ruthenium dichloride, (tricyclopentylphosphine)(1,3-dimesityl-4,5-dihydroimidazol-2-ylidene) dimethylvinylmethylidene ruthenium dichloride, (tricyclohexylphosphine)(1,3-dimesityl-4,5-dihydroimidazol-2-ylidene) dimethylvinylmethylidene ruthenium dichloride, (tricyclohexylphosphine)(1,3-dimesitylimidazol-2-ylidene) benzylidene ruthenium dichloride, (tricyclopentylphosphine)(1,3-dimesitylimidazol-2-ylidene) dimethylvinylmethylidene ruthenium dichloride, and (tricyclohexylphosphine)(1,3-dimesitylimidazol-2-ylidene) dimethylvinylmethylidene ruthenium dichloride.

Numerous metal carbene olefin metathesis catalysts are known, such as described in previously cited U.S. Pat. No. 10,239,965.

The composition typically comprises the metathesis catalyst in an amount ranging from about 0.0001 wt. % to 2 wt. % catalyst based on the total weight of the composition. In some embodiments, the composition typically comprises at least 0.0005, 0.001, 0.005, 0.01, 0.05, 0.10, 0.15 or 0.20 wt. % catalyst. In some embodiments, the composition typically comprises no greater than 1.5, 1, or 0.5 wt. % catalyst.

The composition may optionally further comprise a rate modifier such as, for example, triphenylphosphine (TPP), tricyclopentylphosphine, tricyclohexylphosphine, triisopropylphosphine, trialkylphosphites, triarylphosphites, mixed phosphites, pyridine, or other Lewis base. The rate modifier may be added to the cyclic olefin component to retard or accelerate the rate of polymerization as required. The amount of rate modifier can be the same amounts just described for the catalyst. Typically, the amount of rate modifier is less than 0.01 or 0.005 wt. % based on the total amount of cyclic olefin.

The composition typically further comprises an adhesion promoter. In some embodiments, the adhesion promoter is a compound containing at least two isocyanate groups. The adhesion promoter may be a diisocyanate, triisocyanate, or polyisocyanate (i.e., containing four or more isocyanate groups). The adhesion promoter may be a mixture of at least one diisocyanate, triisocyanate, or polyisocyanate. In some embodiments, the adhesion promoter is a diisocyanate compound, or mixtures of diisocyanate compounds.

In some embodiments, the adhesion promoter is an aliphatic diisocyanate. Aliphatic diisocyanates comprise a linear, branched, or cyclic saturated or unsaturated hydrocarbon group typically containing 1 to about 24 carbon atoms. In some embodiments, the alkyl diisocyanate contains at least 2, 3, 4, 5, or 6 carbon atoms. In some embodiments, the aliphatic diisocyanate contains no greater than 22, 20, 18, 16, 14, or 12 carbon atoms. Representative examples include hexamethylene diisocyanate (HDI), octamethylene diisocyanate, decamethylene diisocyanate, and the like. In some embodiments, the aliphatic diisocyanate comprises a cycloaliphatic (e.g. cyclcoalkyl) moiety, typically having 4 to 16 carbon atoms, such as cyclohexyl, cyclooctyl, cyclodecyl, and the like. In one embodiments, the cycloalkyl diisocyanate is isophorone diisocyanate (IPDI) and the isomers of isocyanato-[(isocyanatocyclohexyl) methyl]cyclohexane ($H_{12}$MDI).

In some embodiments, the adhesion promoter is an aromatic diisocyanate. Aromatic diisocyanates include one or more aromatic rings that are fused together or covalently bonded with an organic linking group such as an alkylene (e.g. methylene or ethylene) moiety. Representative aromatic moieties include phenyl, tolyl, xylyl, napthyl, biphenyl, diphenylether, benzophenone, and the like. Suitable aromatic diisocyanates contain 6 to 24 carbon atoms, such as toluene diisocyanates, xylene diisocyanate, xylylene diisocyanate, tetramethylxylylene diisocyanate (TMXDI), and methylene diphenyl diisocyanate (MDI), that may comprise any mixture of its three isomers, 2,2'-MDI, 2,4'-MDI, and 4,4'-MDI.

In some embodiments, the adhesion promoters is a polymeric polyisocyanate (e.g. diisocyanate). Polymeric isocyanates include for example PM200 (poly MDI), Lupranate™ (poly MDI from BASF), various isocyanate terminated polybutadiene prepolymers available from Cray Valley including Krasol™ LBD2000 (TDI based), Krasol™ LBD3000 (TDI based), Krasol™ NN-22 (MDI based), Krasol™ NN-23 (MDI based), Krasol™ NN-25 (MDI based); as well as polyisocyanate prepolymers available from Convestro including the trade designations DESMODUR E-28 (MDI based) and Baytec ME-230 (modified MDI based on polytetramethylene ether glycol (PTMEG).

The polymeric isocyanate adhesion promoter is typically the reaction product of a polyol and MDI. The polyol typically has one or more oxygen atoms in the backbone such as in the case of polytetramethylene ether glycol and polypropylene oxide.

In some embodiments, the (e.g. polytetramethylene ether glycol) polyol has a molecular weight of about 90 g/mol. Such polymeric isocyanate may have a NCO content of greater than 15, 16, 17, 18, 19, or 20 wt. %. The NCO content is typically no greater than 25 wt. %.

In some embodiments, the (e.g. polypropylene oxide) polyol has a molecular weight of at least 1000, 1100, 1200, 1300, 1400, 1500, 1600, 1700, 1800, 1900, or 2000 g/mol. The amount of polymerized polyol is typically less than 55, 50, 45, or 40 wt. % of the polymeric isocyanate. Such polymeric isocyanate may have a NCO content of greater than 10, 11, 12, 13, 14, or 15 wt. %. The NCO content is typically no greater than 20 wt. %. The equivalent weight of the polymeric polyol can be less than 400, 350, or 300 g/mole/NCO group. The equivalent weight is typically at least 150, 200 or 250 g/mole/NCO group.

In some embodiments, the polymeric isocyanate adhesion promoter has a viscosity of at least 3000, 3500, 4000, 4500, or 5000 mPa sec. The viscosity of the polymeric isocyanate is typically no greater than 15,000 or 10,000 mPa sec. In other embodiments, the viscosity is less than 1000 or 500 mPa sec. The viscosity is indicative of the molecular weight.

The composition typically comprises at least 0.005, 0.006, 0.007, 0.008, 0.009, 0.010 of adhesion promotor based on the total weight of the composition. In some embodiments, the amount of adhesion promoter is not greater than 1, 0.9, 0.8, 0.7, 0.6, 0.5, 0.4, 0.3, or 0.2 wt. % of the total weight of the composition.

The composition may optionally further comprise a (e.g. polyolefin) elastomer, such as polybutadiene, polyisoprene, as well as styrenic block copolymers (SEBS) including functional elastomers such as maleic anhydride grafted styrene-ethylene/butylene-styrene hydrogenated copolymers (hydrogenated SEBS-g-MA). Maleic anhydride grafted styrene-ethylene/butylene-styrene hydrogenated copolymers typically comprise at least 0.1, 0.2, 0.3, 0.4 or 0.5 wt. % of grafted maleic anhydride. The amount of grafted maleic anhydride is typically no greater than 7, 6, 5, 4, 3, or 2 wt. %. Maleic anhydride grafted styrene-ethylene/butylene-styrene hydrogenated copolymers typically comprise at least 10 and no greater than 60, 50, or 40% polystyrene. Suitable functional elastomers are commercially available from Kraton Performance Polymers as the trade designations "Kraton FG1901G" and "Kraton FG1924G". The amount of (e.g. functional) elastomer when present in typically at least 0.001, 0.05, or 0.1 wt. % based on the weight of the cyclic olefin. The amount of polymerizable (e.g. functional) elastomer is typically not greater than 10, 9, 8, 7, 6, 5, 4, or 3 wt. % based on the weight of the cyclic olefin. The presence of such polymerizable (e.g. polyolefin) elastomer can improve the mechanical properties.

The composition comprises thermally conductive inorganic particles. Generally, the particle size and loading levels of the inorganic particles are selected to provide the desired thermal conductivity. In some embodiments, the thermal conductivity of the cured composition (as determined by the test method described in the examples) is at least 1.0 W/m*K. In some embodiments, the thermal conductivity of the cured composition is at least 1.1, 1.2, 1.3, 1.4, 1.5 1.6, 1.7, 1.8, 1.9, or 2.0 W/m*K. In some embodiments, the thermal conductivity of the cured composition is no greater than 3.0, 2.9, 2.8, 2.7, 2.6, 2.5, 2.4, 2.3, 2.3, 2.1 or 2.0 W/m*K.

The composition typically comprises thermally conductive particles in an amount of at least 40 wt. % based on the total weight of the composition. The amount of thermally conductive particles can vary depending on the density of the thermally conductive particles.

In some embodiments, the amount of thermally conductive inorganic fillers is at least 41, 42, 43, 44, 45, 46, 47, 48, 49, or 50 wt. % of the composition. The amount of thermally conductive inorganic fillers is typically no greater than 95, 94, 93, 92, 91, or 90 wt. % of the composition. In some embodiments, the amount of thermally conductive filler is no greater than 89, 88, 87, 86, 85, 84, 83, 82, 81, or 80 wt. % of the composition. In some embodiments, the amount of thermally conductive filler is no greater than 79, 78, 75, 74, 73, 72, 71, 70, 69, 68, 67, 66, 65, 64, 63, 62, 61, or 60 wt. % of the composition.

In some embodiments, such as when the thermally conductive particles have a low density (no greater than 2.3,.2.2, or 2.1 g/cc) such as in the case of boron nitride, the composition typically comprises at least 25, 26, 27, 28, 29, or 30 vol. % thermally conductive particles. In other embodiments, such as when the thermally conductive particles comprise a mixture of lower density particles and high density particles (at least 2.4, 2.5, 2.6, 2.7, 2.8, 2.9, 3.0, 3.1, or 3.2 g/cc), the composition typically comprises at 30, 31, 32, 33, 34, 35, 36, 37, 38, 39, or 40 vol. % thermally conductive particles. In other embodiments, such as when the thermally conductive particles comprise alumina or a mixture of higher density thermally conductive particles, the composition typically comprises at least 41, 42, 43, 44, or 45 vol. % thermally conductive particles. The vol. % of thermally conductive particles is typically no greater than 70, 69, 68, 67, or 65 vol. %. In some embodiments, the vol. % is no greater than 64, 63, 62, 61, 60, 59, 58, 57, 56, or 55 vol. %. In some embodiments, the vol. % is no greater than 54, 53, 52, 51, 50, 49, 48, 47, 46, 45 vol. %. In some embodiments, the vol. % is no greater than 44, 43, 42, 41, 40, 39, 38, 37, 36, or 35 vol. %. of the composition.

In some embodiments, the thermally conductive inorganic particles are preferably an electrically non-conductive material. Suitable electrically non-conductive, thermally conductive materials include ceramics such as metal oxides, hydroxides, oxyhydroxides, silicates, borides, carbides, and nitrides. Suitable ceramic fillers include, e.g., silicon oxide, zinc oxide, alumina trihydrate (ATH) (also known as hydrated alumina, aluminum oxide, and aluminum trihydroxide), aluminum nitride, boron nitride, silicon carbide, and beryllium oxide. Other thermally conducting fillers include carbon-based materials such as graphite and metals such as aluminum and copper. Combinations of different thermally conductive materials may be utilized. Such materials are not electrically conductive, i.e. have an electronic band gap greater than 0 eV and in some embodiments, at least 1, 2, 3, 4, or 5 eV. In some embodiments, such materials have an electronic band gap no greater than 15 or 20 eV. In this embodiment, the composition may optionally further comprise a small concentration of thermally conductive particles having an electronic band gap of less than 0 eV or greater than 20 eV.

In some embodiments, such as the composition comprises alumina trihydrate, the composition can pass the UL94 V-0 flammability standard.

In favored embodiments, the thermally conductive particles comprise a material having a bulk thermal conductivity >10 W/m*K. The thermal conductivity of some representative inorganic materials is set forth in the following table.

| Thermally Conductive Materials | | | |
|---|---|---|---|
| Material | Thermal Conductivity (W/m*K) | Electronic Band Gap (eV) | Density |
| α-Aluminum Oxide[1] | 30 | 5-9 | 3.95 g/cc |
| Alumina Trihydrate[2] | 21 | | 2.42-2.45 g/cc |
| Silicon Carbide (SiC)[1] | 120 | 2.4 | 3.21 g/cc |
| Hexagonal Boron Nitride (BN)[1] | 185-300 | 2.1 | 2.1 g/cc |

In some embodiments, the thermally conductive particles comprise material(s) having a bulk thermal conductivity of at least 15 or 20 W/m*K. In other embodiments, the thermally conductive particles comprise material(s) having a bulk thermal conductivity of at least 25 or 30 W/m*K. In yet other embodiments, the thermally conductive particles comprise material(s) having a bulk thermal conductivity of at least 50, 75 or 100 W/m*K. In yet other embodiments, the thermally conductive particles comprise material(s) having a bulk thermal conductivity of at least 150 W/m*K. In typical embodiments, the thermally conductive particles comprise material(s) having a bulk thermal conductivity of no greater than about 350 or 300 W/m*K.

Thermally conductive particles are available in numerous shapes, e.g. spheres and acicular shapes that may be irregular or platelike. In some embodiments, the thermally conductive particles are crystals, typically have a geometric shape. For example, boron nitride hexagonal crystals are commercially available from Momentive. Further, alumina trihydrate is described as a hexagonal platelet. Combinations of particles with different shapes may be utilized. The thermally conductive particles generally have an aspect ratio less than 100:1, 75:1, or 50:1. In some embodiment, the thermally conductive particles have an aspect ratio less than 3:1, 2.5:1, 2:1, or 1.5:1. In some embodiments, generally symmetrical (e.g., spherical, semi-spherical) particles may be employed.

In some embodiments, the thermally conductive particles comprise a combination of smaller particles and larger particles. The combination of particle sizes can provide higher thermal conductivity, than thermally conductive particles having an intermediate median particle size and a normal particle size distribution. Without intending to be bound by theory it is surmised that including a sufficient amount of smaller particles of the proper particle size improves the thermal conductivity between the larger particles.

With regard to the smaller particles, at least 20, 25, 30, 35, 40, 45, 50 vol. % of the thermally conductive particles have a particle size no greater than 10 microns. In some embodiments, at least 10, 15, 20, 25 30, 35, 40, 45, 50, 55 or 60 vol. % of the thermally conductive particles have a particle size less than 5 microns. In some embodiments, at least 10% of the thermally conductive particles have a particle size less than 1 or 2 microns. In some embodiments, at least 20, 25, or 30 vol. % of the thermally conductive particles have a particle size less than 1 or 2 microns. In other embodiments, less than 10 vol. % of the thermally conductive particles have a particle size less than 1 or 2 microns.

With regard to the larger, particles at least 10, 15, 20, 25 or 30 vol. % of the thermally conductive particles have a particle size of at least 30, 40, or 50 microns. In some embodiments, the larger thermally conductive particles have a particle size of at least 55, 60, 65, 70, 75, 80, 85, 90 or 100 microns. The larger particles typically have a particle size of no greater than 200, 190, 180 microns. In some embodiments, the larger thermally conductive particles have a particle size of no greater than 170, 160, 150, 140 microns. In some embodiments, the larger thermally conductive particles have a particle size of no greater than 130, 120, 110 microns. In some embodiments, the larger thermally conductive particles have a particle size of no greater than 100, 90, 80 microns. In some embodiments, 5 vol. % of the particles have a particle size greater than 55, 60, 65, 70, 75, 80, 85, 90 or 100 microns. In some embodiments, 5 vol. % of the particles have a particle size greater than 110, 115, 120, 125, 130, 135, 140, 145, 150, 155, 160, 166, 170, 175, 180, or 185 microns.

The combination of smaller particles and larger particles can be obtained by selection of certain (e.g. commercially available) thermally conductive particles having at least a bimodal particle size distribution. The combination of smaller particles and larger particles can also be obtained by combining two or more (e.g. commercially available) thermally conductive particles having a normal particle size distribution, but sufficiently different median particles sizes.

Especially when the combination of particles is obtained by combining thermally conductive particles having a normal particle size distribution, but different median particles sizes; the thermally conductive particles further comprises particle having an intermediate particle size. Hence, the thermally conductive particles further comprise particles ranging from greater than 10 to less than 30 microns. The sum of the smaller particles (i.e. no greater than 10 microns), larger particles (at least 30 microns) and intermediate particles is typically 95, 96, 97, 98, 99, or 100% of the thermally conductive particles. The thermally conductive particles may optionally comprise 1, 2, 3, 4, or 5% of (e.g. extra-large) particles, having a particle size greater than 200 microns.

The particle size of the thermally conductive particle can be determined utilizing the test method described in the examples.

In typical embodiments, particle size refers to the "primary particle size", meaning the diameter of a single (non-aggregate, non-agglomerate) particle. The primary particles can form an "agglomerate", i.e. a weak association between primary particles which may be held together by charge or polarity and can be broken down into smaller entities. These weakly bound agglomerates would typically break down during high energy mixing processes. In some embodiments, the particle size may be the particle size of an aggregate, i.e. two or more primary particles bonded to each other. Depending on the viscosity and mixing technique, the aggregates may break down into smaller entities during mixing.

In some embodiments, the composition comprises one or more dispersants. The dispersants can reduce the viscosity and stabilize the inorganic filler particles in the composition such that the thermally conductive particles are uniformly dispersed in the cyclic olefin. In some embodiments, the dispersant may be pre-mixed with the thermally conductive particles prior to combining with the cyclic olefin component. In some embodiments, suitable dispersants include a binding group and a compatibilizing segment. The binding group may be ionically bonded to the particle surface.

Examples of binding groups for alumina particles include phosphoric acid, phosphonic acid, sulfonic acid, carboxylic acid, and amine. The compatibilizing segment may be selected to be miscible with the cyclic olefin. Useful compatibilizing agents may include polyalkylene oxides, e.g., polypropylene oxide, polyethylene oxide, as well as polycaprolactones, polyimines and combinations thereof. Various dispersants for thermoset composites are commercially available such as from Lubrizol under the trade designation Solplus™.

In some embodiments, dispersant(s) may be present in the composition in an amount of at least 0.1, 0.2, 0.3, or 0.4 wt. % ranging up to 5 wt.-%, based on the total weight of the composition. In some embodiments, the amount of dispersant(s) is no greater than 4, 3, 2 or 2 wt. %.

The composition may be optionally comprise various additives. Suitable additives include, but are not limited to, gel modifiers, hardness modulators, antioxidants, stabilizers, crosslinkers, non-thermally conductive fillers, binders, coupling agents, thixotropes, wetting agents, biocides, plasticizers, pigments, flame retardants (other than alumina trihydrate), dyes, and fibers.

The amount of additives present in the compositions may vary depending on the particular type of additive used. The total concentration of such additives in the compositions is typically no greater than 10, 9, 8, 7, 6, 5, 4, 3, 2, or 1 wt. % of the composition.

Due to the high concentration of thermally conductive particles, the compositions are typically pastes at room temperature. The viscosity of the composition is typically at least 100,000; 150,000; 200,000; 250,000 or 300,000 cps at a shear rate of 1 l/second and at 25° C. The viscosity of the composition is typically no greater than 750,000; 700,000; 650,000; 600,000; 550,000 or 500,000 cps at a shear rate of 1 l/second and at 25° C.

In typical embodiments the compositions are provided as a two-part composition. The catalyst is provided in a separate container (e.g. chamber of a two-component dispensing system) than the cyclic olefin. The volume ratio of the first cyclic olefin part to catalyst part is typically in the range of 10:1 to 100:1. A portion of the filler and/or dispersant is included with the catalyst part in order that the first and second part have sufficiently similar viscosities. The separate parts are mixed prior to use.

The curable compositions described herein are suitable for use as a (e.g. structural) adhesive.

In one embodiment, a method of bonding is described comprising providing a composition as described herein; providing the composition between a first and second substrate; and polymerizing the cyclic olefin. The cyclic olefin is typically polymerized by exposure to heat. The substrates may comprise an organic polymer or an inorganic material (e.g. aluminum).

The curable compositions described herein are also suitable for molded articles. In one embodiment, a method of making an article is described comprising providing a composition as described herein; dispensing the composition into a mold; and polymerizing the cyclic olefin. The cyclic olefin is typically polymerized by exposure to heat.

As evident by the forthcoming examples, the composition described herein can have various physical properties in addition to high thermal conductivity. Such physical properties can be determined by the test methods describe in the forthcoming examples.

In some embodiments, the cured composition has a glass transition temperature (Tg) of at least 50, 55, 60, 65, or 70° C. (as determined by the DMA test method described in the examples). The Tg is typically no greater than 185° C. In some embodiments, the Tg is no greater than 175, 170, 165, 160, 155, 150, 145, 140, 135, 130, 125, or 120° C. The composition can be (heat) cured under various conditions such as temperatures of 130, 140, 150, 160, 170, 180, 190, or 2000 for 2 hours prior to determining the Tg.

In some embodiments, the cured composition exhibits an overlap shear adhesion to aluminum of at least 1, 2, 3, 4, or 5 MPa when tested at temperature of 25° C. or 140° C. The composition can be (heat) cured at 80° C. for 1 hour or 130° C. for 2 hours prior to testing.

In some embodiments, the cured composition exhibits a dielectric constant of less than or equal to 4, 3.5 or 3. The dielectric constant is typically at least 2.5. In some embodiments, the tan delta is less than or equal to 0.005 for frequencies ranging from $1\times10^3$ to $1\times10^6$. The tan delta is typically at least 0.001 or 0.0015. Thus, the cured composition can be characterized as radio frequency transparent.

In some embodiments, the cured composition has a maximum tensile strength of at least 1, 2, 3, or 4 MPa ranging up to 10, 11, 12, 13, 14, 15, 16, 17, 18, 19 or 20 MPa. In some embodiments, the cured composition has a tensile strength less than 4, 3, 2, or 1 MPa. In some embodiments, the cured composition has an elongation at break of at least 1, 2, 3, 4, or 5% ranging up to 50, 60, 70, 80, 90 or 100%. In some embodiments, the cured composition has a Young's modulus (E) of at least 5, 10, 15, 20, or 25 MPa ranging up to 500, 1000, 1500 or 2000 MPa. When the composition comprises mono-olefin such as alkyl-norbornene, the cohesive strength (e.g. tensile strength and modulus) can be lower; however the elongation can be higher.

The cured composition exhibits good hydrolytic stability after aging as evidenced by the tensile strength staying the same or increasing after aging. Further the elongation typically also stays the same or decreases with aging. In some embodiments, the tensile strength may decrease, but no greater than 25, 20, 15 or 10%. Likewise, in some embodiments, the elongation may decrease, but no greater than 25, 20, 15 or 10%.

In some embodiments, the dielectric breakdown is at least 2, 3, 4, 5, 6, 7, 8, 9, or 10 kV/mm ranging up to 35, 40, 45, 50, 55, 60, 65, or 70 kV/mm.

In some embodiments, the volume resistivity is at least $1\times10^{12}$, $1\times10^{13}$, $1\times10^{14}$ ohm-cm ranging up to $1\times10^{15}$ or $1\times10^{16}$ ohm-cm.

In some embodiments, the composition has a low density, as compared to other (e.g. epoxy) thermosetting compositions having the same thermally conductive filler at the same concentration. Since the density increases with increasing filler concentration, the density can be expressed based on a ratio of density/volume % filler. The density/volume % filler can be less than 5.5, 5.4, 5.3, 5.2, 5.1, 5.0, 4.9, 4.8, 4.7, 4.6 or 4.5. In some embodiments, the density/volume % filler is less than 4.4, 4.3, 4.2, 4.1, 4.0, 3.9, 3.8, 3.7, 3.6 or 3.5. In some embodiments, the density/volume % filler is less than 3.4, 3.3, 3.2, 3.1, 3.0, 2.9, 2.8, 2.7, 2.6 or 2.5.

The curable and cured compositions described herein are useful for coatings, shaped (e.g. molded) articles, adhesives (including structural and semi-structural adhesives), magnetic media, filled or reinforced composites, caulking and sealing compounds, casting and molding compounds, potting and encapsulating compounds, impregnating and coating compounds, conductive adhesives for electronics, protective coatings for electronics, as primers or adhesion-promoting layers, and other uses wherein thermally conductivity is of importance. In some embodiments, an article is described comprising a substrate, having a cured coating composition as described herein disposed on a surface of the substrate.

In some embodiments, the curable composition may function as a structural adhesive, i.e. the curable composition is capable of bonding a first substrate to a second substrate, after curing. Generally, the bond strength (e.g. peel strength, overlap shear strength, or impact strength) of a structural adhesive continues to build well after the initial cure time. In some embodiments, an article is described comprising a first substrate, a second substrate and a cured composition disposed between and adhering the first substrate to the second substrate, wherein the cured composition is the reaction product of the curable composition described herein. In some embodiments, the first and/or second substrate may be at least one of a metal, a ceramic and a polymer, e.g. a thermoplastic.

The curable compositions may be coated onto substrates at useful thicknesses ranging from 5 microns to 10000 microns, 25 micrometers to 10000 micrometers, 100 micrometers to 5000 micrometers, or 250 micrometers to 1000 micrometers. Useful substrates can be inorganic, organic, or combinations thereof. Representative examples of useful substrates include ceramics, siliceous substrates including glass, metal (e.g., aluminum or steel), natural and man-made stone, woven and nonwoven articles, polymeric materials, including thermoplastic and thermosets, (such as polymethyl (meth)acrylate, polycarbonate, polystyrene, styrene copolymers, such as styrene acrylonitrile copolymers, polyesters, polyethylene terephthalate), silicones, paints (such as those based on acrylic resins), powder coatings (such as polyurethane or hybrid powder coatings), and wood; and composites of the foregoing materials.

In another aspect a coated article is described comprising a metal substrate comprising a coating of the uncured, partially cured or fully cured curable composition on at least one surface thereof. When the substrate has two major surfaces, the coating can be coated on one or both major surfaces of the metal substrate and can comprise additional layers, such as bonding, tying, protective, and topcoat layers. The metal substrate can be, for example, at least one of the inner and outer surfaces of a pipe, vessel, conduit, rod, profile shaped article, sheet or tube.

In some embodiments, the composition is useful for thermal management in electronics such as, for example, electric vehicle (EV) battery assembly, power electronics, electronic packaging, LED, solar cells, electric grid, and the like. In one embodiment, a battery module is described comprising a plurality of battery cells connected to a (e.g. first) base plate by a (e.g. first) layer of a composition as described herein, such as described in WO 2019/070819; incorporated herein by reference.

Advantages and embodiments of this disclosure are further illustrated by the following examples, but the particular materials and amounts thereof recited in these examples, as well as other conditions and details, should not be construed to unduly limit this invention. In these examples, all percentages, proportions and ratios are by weight unless otherwise indicated.

EXAMPLES

Unless otherwise noted or readily apparent from the context, all parts, percentages, ratios, etc. in the Examples and the rest of the specification are by weight. The particles size information reported in the materials table was obtained from supplier literature.

| Materials Used in the Examples | | | |
|---|---|---|---|
| Abbreviation | Trade Designation | Description | Supplier |
| DCPD-1 | Thermoset resin obtained under the trade designation PROXIMA HTI 1837 | Cyclic Olefin | Materia Inc., Pasadena, CA |
| DCPD-2 | Thermoset resin obtained under the trade designation PROXIMA HPR 2128 | Cyclic Olefin | Materia Inc. |
| Catalyst-1 | Catalyst using Grubbs catalyst technology obtained under the trade designation GRUBBS CATALYST CT762 | Catalyst | Materia Inc. |
| Filler 1 | Aluminum hydroxide (99.6%) filler obtained under the trade designation MOLDXA 110 ALUMINUM HYDROXIDE (ATH) | Thermally Conductive Filler, 80% 325 mesh (44 microns), 41% less than 10 microns | Huber, Atlanta, GA |
| Filler 2 | Spherical alumina (99.8%) obtained under the trade designation BAK-70 | Thermally Conductive Filler, D(10) = 41 microns D(50) = 70 microns D(90) = 107 microns | Bestry Performance Materials, Shanghai, China |
| Filler 3 | Spherical alumina (99.8) obtained under the trade designation BAK-40 | Thermally Conductive Filler D(10) = 23 microns D(50) = 41 microns D(90) = 68 microns | Bestry |
| Filler 4 | Spherical alumina (99.8) obtained under the trade designation BAK-10 | Thermally Conductive Filler D(10) = 5 microns D(50) = 11 microns D(90) = 22 microns | Bestry |
| Filler 5 | Spherical alumina (99.8) obtained under the trade designation BAK-15 | Thermally Conductive Filler D(10) = 7 microns D(50) = 14 microns D(90) = 23 microns | Bestry |
| Filler 6 | Alumina-based filler obtained under the trade designation MARTOXID TM2250 | Coated Thermally Conductive Filler D(50) = 1.6 microns D(100) = 20 microns | Huber |
| Filler 7 | Alumina-based filler obtained under the trade designation MARTOXID TM1250 | Thermally Conductive Filler D(50) = 1.6 microns D(100) = 20 microns | Huber |
| Filler 8 | Boron nitride (BN) NX1 with mean particle size = 0.9 microns | Thermally Conductive Filler | Momentive, Waterford, NY |
| Filler 9 | BN NX10 with mean particle size = 10 microns | Thermally Conductive Filler | Momentive |
| Dispersant 1 | Polymeric dispersant obtained under the trade designation SOLPLUS D510 | Dispersant | Lubrizol, Brecksville, OH |
| Adhesion Promoter 1 | Polyisocyanate prepolymer based on diphenylmethane diisocyanate (MDI) obtained under the trade designation DESMODUR E-28 | Adhesion Promoter | Covestro, Leverkusen, Germany |
| Adhesion Promoter 2 | A modified diphenylmethane diisocyanate (MDI)-terminated polyether prepolymer based on polytetramethylene ether glycol (PTMEG), under the trade designation Baytec ME-230 | Adhesion Promoter | Covestro, Leverkusen, Germany |

All the compositions were prepared as follows: First, the thermoset resin was combined with the adhesion promoter by hand mixing. Next the catalyst was added followed by hand mixing. Then each filler was added and hand-mixed. The final step is to thoroughly mix the paste in a speed mixer (SPEEDMIXER DAC 150.1 FVZ-K, FlackTek, Inc. Landrum, S.C.) using speed of 2000 revolutions per minute (rpm) for 2 minutes at room temperature. After mixing, the resulting paste was placed between two release liner and conveyed through a bar coater thereby providing a film having a thickness of about 1 mm. The concentration of each of the components of the compositions is described in Tables 2A, 2B, and 2C below.

Test Methods

Thermal Conductivity Test

The 1 mm thick films prepared from EX. 1-6 and CE-A were cured at 90° C. for 1 hour, the film of EX. 7 was cured at 80° C. for 2 hour, and the films of EX. 8-10 were cured at 80° C. for 2 hours and then 130° C. for 2 hours prior to determining the thermal conductivity.

The thermal conductivity of the films was measured according to ASTM D5470 ("Standard Test Method for Thermal Transmission Properties of Thermally Conductive Electrical Insulation Materials") using the Thermal Interface Material Tester Model TIM1300 from AnalysisTech (Wakefield, MA). 33 mm discs were cut out of the densified squares using a hole punch. The test temperature was 50° C. and the applied test pressure was set to 100 psi. The instruments thickness gauge was used to measure the thickness of the sample during testing.

Overlap Shear Adhesion (OLS)

Two 0.5 inch (1.27 centimeters (cm)) wide×4 inch (10 cm) long×0.125 inch (0.32 cm) thick aluminum coupons were cleaned using methyl ethyl ketone (MEK) and otherwise left untreated. At the tip of one coupon, a 0.5 inch by 0.5 inch (1.27 cm×1.27 cm) square was covered by the mixed thiol/epoxy paste and then laminated with another coupon in the opposite tip direction to give about 10 to 30 mils (0.25 to 0.76 millimeters (mm)) of paste between the aluminum coupons, which was clamped by a binder clip. The laminated aluminum coupons were then cured at 90° C. for 1 hour unless stated otherwise.

OLS tests were conducted on an Instron Universal Testing Machine model 1122 (Instron Corporation, Norwood, MA, USA) according to the procedures of ASTM D1002-01, "Standard Test Method for Apparent Shear Strength of Single-Lap-Joint Adhesively Bonded Metal Specimens by Tension Loading (Metal-to-Metal)." The crosshead speed was 0.05 inch/minute (1.27 mm/minute). If the OLS is lower than 0.01 MPa, it was marked as "not measurable". The tests were conducted at 25° C. unless stated otherwise.

Tensile Properties

For tensile strength tests, dog bone-shaped samples were made in accordance with ASTM D1708-13 by pressing the mixed paste into a dog bone-shaped silicone rubber mold, which was then laminated with release liner on both sides. The dog bone shape gives a sample with a length of about 0.6 inch in the center straight area, a width of about 0.2 inch in the narrowest area, and a thickness of about 0.06 to about 0.1 inch. Samples were then cured at 80° C. for 1 hour. Tensile strength tests were conducted on an Instron Universal Testing Machine model 1122 (Instron Corporation, Norwood, MA, US) according to ASTM D638-14, "Standard Test Method for Tensile Properties of Plastics." The crosshead speed was 0.04 inch/minute (1 mm/minute). The tests were conducted at 25° C. unless stated otherwise. Modulus was calculated from the slope of the linear portion of the stress-strain curve.

Aging

Aging was performed on the dog bone-shaped samples according to the BMW SAE PR308.2, "Climatic Test for Bonded Joints" standard. At least 5 test specimens were tested, which were pre-cured for at least 24 hours at room temperature. A single test cycle included 7 steps: Step 1: start at 23° C. at 20% relative humidity (RH); Step 2: ramp up to 90° C. and 80% RH in 1 hour; Step 3: Stay at 90° C. and 80% RH for 4 hours; Step 4: cool and dehumidify the system to 23° C. and 20% RH; Step 5: Cool the system to −30° C. in 1 hour; Step 6: Stay at −30° C. for 4 hours; Step 7: Heat the system to 23° C. and 20% RH in 1 hour. 20 cycles were required to complete the aging test. Physical properties (tensile strength and elongation) of the cured compositions were measured before and after PR308.2 cycling.

Dielectric Breakdown Strength

The films were cured at 90° C. for 1 hour prior to determining the dielectric breakdown strength. Dielectric breakdown strength measurements were performed according to ASTM D149-09(2013), "Standard Test Method for Dielectric Breakdown Voltage and Dielectric Strength of Solid Electrical Insulating Materials at Commercial Power Frequencies" using a Model 6TC4100-10/50-2/D149 Automated Dielectric Breakdown Test Set (Phenix Technologies, Accident, MD, US) that is specifically designed for testing DC breakdown from 3-100 kV and AC breakdown in the 1-50 kV, 60 Hz range. Each measurement was performed while the sample was immersed in FLUORINERT FC-40 fluid (3M Corporation, Saint Paul, MN, US). The average breakdown strength was based on an average of measurements up to 10 or more samples. As is typical, a frequency of 60 Hz and a ramp rate of 500 volts per second was utilized for these tests.

Electrical Volume Resistivity

The films were cured at 90° C. for 1 hour prior to electrical volume resistivity measurement. The electrical volume resistivity was measured with a Keithley Model 6517 A electrometer (Tektronix, Beaverton, OR, US) with 100 femtoAmp resolution and an applied voltage of 500 Volts, according to the procedures in to ASTM D257-14, "Standard Test Methods for DC Resistance or Conductance of Insulating Materials." A Keithley Model 8009 Resistivity test fixture was used with compressible conductive rubber electrodes and 1 lb electrode force over approximately 2.5 inches of electrode and sample. The samples were approximately 18 mils thick. The corresponding detection threshold for surface resistivity is approximately 1017 ohms. Each sample was measured once, and an electrification time of 60 seconds was employed. A high resistance sample PTFE, a low resistance sample (bulk loaded carbon in kapton), and a moderate resistance sample (paper) were used as material reference standards.

Dielectric Constant/Permittivity and Loss Tan Delta

The films were cured at 80° C. for 2 hours and then 130° C. for 2 hours prior to testing. The dielectric properties and electrical conductivity measurements were performed with an Alpha-A High Temperature Broadband Dielectric Spectrometer modular measurement system from Novocontrol Technologies Gmbh (Montabaur, Germany). All testing was performed in accordance with the ASTM D150 test standard. Surfaces of the cured films were painted with copper or silver paint and laminated onto the brass electrode The Novocontrol ZGS Alpha Active Sample Cell was implemented once each sample was placed between two optically polished brass disks (diameter 40.0 mm and thickness 2.00 mm).

Flame Retardancy

For flame retardancy tests, strip samples were made by pressing the mixed uncured paste into strip-shaped silicone rubber molds, and were then laminated with release liner on both sides. The resulting samples had a length of about 5 inch (12.7 cm), a width of 0.5 inch (1.27 cm), and a thickness of 0.06 inch (1.52 mm). Samples were then cured at 90° C. for 1 hour prior to flame retardancy testing. Both horizontal and vertical testing configurations were conducted using a burner with methane gas, in accordance with the procedures outlined in UL94 "Tests for Flammability of Plastic Materials for Parts in Devices and Appliances."

Tg by Dynamic Mechanical Analysis (DMA)

The films were cured according to the conditions described in Table 9 prior to testing. Storage modulus (G') was collected on a DMA Q800 (TA Instruments, Wood Dale, IL, US), equipped with sample chamber mounts to the DMA in place of the standard furnace to precisely control the temperature to +/−0.1° C. The specimen was made and cut into a rectangular geometry with length of approximately 8 to 15 mm, width of approximately 6 to 7 mm, and thickness of approximately 1 to 2 mm. The measurements used temperature sweep from −30° C. to 60° C. at 1 Hz frequency with 15 micron oscillating amplitude, 0.01 N static force.

Method for Determining Particle Size

Particle size analysis was performed using a three laser diffraction analyzer (Microtrac S3500). The particles were first dispersed in a 2% solution of sodium hexametaphosphate and water to approximately 10% particles by mass. A standard protocol for measuring particle size was used on the S3500—SOP settings were the following: a transparent particle with refractive index of 1.58, an irregular shape, and the dispersal media was water (1.33 RI). Particles were loaded to the correct concentration in the instrument via the built in loading calculator on the Microtrac software. Prior to measuring the particle distribution the particle dispersion was ultrasonicated for 10 seconds with the built in ultrasonic generator on the analyzer to break up any large agglomerates. Three 30 second sequential measurements were taken of the particles and the average particle size distribution was reported.

Particle Size of Thermally Conductive Particles of Examples

The particle size of the thermally conductive particles was determined according to the test method just described. Following are the test results:

| BAK40:Tm2250 of Ex. 1, 2, 4, and 8 | | ATH Mold A110 (bimodal) of Ex. 3 | | BAK70:BAK40:Tm2250 of Ex. 5 and 6 | | NX1:NX10 of Example 9 | |
|---|---|---|---|---|---|---|---|
| Vol. % Tile | Size (micron) | Vol. % Tile | Size (micron) | Vol. % Tile | Size (micron) | Vol. % Tile | Size (micron) |
| 10.00 | 0.639 | 10.00 | 2.374 | 10 | 1.081 | 10 | 0.819 |
| 20.00 | 1.183 | 20.00 | 3.72 | 20 | 2.164 | 20 | 2.535 |
| 30.00 | 1.802 | 30.00 | 4.92 | 30 | 3.22 | 30 | 4.01 |
| 40.00 | 2.454 | 40.00 | 6.3 | 40 | 4.78 | 40 | 5.23 |
| 50.00 | 3.25 | 50.00 | 8.27 | 50 | 6.41 | 50 | 6.49 |
| 60.00 | 4.33 | 60.00 | 11.71 | 60 | 8.07 | 60 | 8.31 |
| 70.00 | 6.01 | 70.00 | 19.24 | 70 | 10.66 | 70 | 12.18 |
| 80.00 | 13.9 | 80.00 | 34.04 | 80 | 25.44 | 80 | 17.98 |
| 90.00 | 58.74 | 90.00 | 55.09 | 90 | 89.45 | 90 | 54.62 |
| 95.00 | 119.2 | 95.00 | 77.36 | 95 | 137.4 | 95 | 184.8 |

TABLE 2A

Weight percent composition of Examples 1 to 4. (Volume percent)

| | | EX-1 | EX-2 | EX-3 | EX-4 |
|---|---|---|---|---|---|
| DCPD-1 | HTI1837 | | 14.5 (39.5) | 17.7 (33.2) | 7.3 (19.8) |
| DCPD-2 | HPR2128 | 19.9 (48.6) | | | 7.3 (19.8) |
| Catalyst-1 | CT762 | 0.40 (0.98) | 0.29 (0.79) | 0.35 (0.66) | 0.29 (0.79) |
| Filler 1 | ATH Bimodal | | | 80.2 (62.3) | |
| Filler 3 | BAK-40 | 23.9 (15.0) | 25.5 (17.8) | | 25.5 (17.7) |
| Filler 6 | TM2250 | 55.7 (34.9) | 59.5 (41.5) | | 59.5 (41.4) |
| Dispersant 1 | Solplus D510 | | | 1.60 (3.0) | |
| Adhesion Promoter 1 | E-28 | 0.20 (0.49) | 0.15 (0.41) | 0.18 (0.34) | 0.18 (0.49) |

TABLE 2B

Weight percent composition of Examples 5 to 7. (Volume percent)

| | | EX-5 | CE-A | EX-6 | EX-7 |
|---|---|---|---|---|---|
| DCPD-1 | HTI1837 | 10.7 (31.6) | 10.7 (31.6) | | |
| DCPD-2 | HPR2128 | | | 10.7 (31.6) | 19.8 (48.3) |
| Catatlyst-1 | CT762 | 0.21 (0.62) | 0.21 (0.62) | 0.21 (0.62) | 1 (0.98) |
| Filler 2 | BAK-70 | 53.4 (40.5) | | 53.4 (40.5) | |
| Filler 3 | BAK-40 | | | | 23.8 (14.9) |
| Filler 4 | BAK-10 | 17.8 (13.5) | | 17.8 (13.5) | |
| Filler 5 | BAK-15 | | 89 (67.4) | | |
| Filler 6 | TM2250 | 17.8 (13.5) | | 17.8 (13.5) | |
| Filler 7 | TM1250 | | | | 55.6 (34.8) |

TABLE 2B-continued

Weight percent composition of Examples 5 to 7. (Volume percent)

|  |  | EX-5 | CE-A | EX-6 | EX-7 |
|---|---|---|---|---|---|
| Adhesion Promoter 1 | E-28 | 0.11 (0.33) | 0.11 (0.33) | 0.11 (0.33) | 0.40 (0.98) |

TABLE 2C

Weight percent composition of Examples 8 to 10. (Volume percent)

|  |  | EX-8 wt % | EX-9 wt % | EX-10 wt % |
|---|---|---|---|---|
| DCPD-1 | HTI1837 | 49.0 (67.8) | 49.0 (67.8) | 36.0 (56.7) |
| Catatlyst-1 | CT762 | 0.98 (1.36) | 0.98 (1.36) | 0.72 (1.13) |
| Filler 8 | BN NX1 |  | 12.3 (7.4) |  |
| Filler 9 | BN NX 10 | 49.02 (29.5) | 36.8 (22.1) | 59.9 (41.0) |
| Adhesion Promoter 2 | ME-230 | 0.98 (1.36) | 0.98 (1.36) | 0.72 (1.13) |

TABLE 3

Tensile Properties

|  | EX-1 | EX-2 | EX-3 | EX-4 | EX-5 |
|---|---|---|---|---|---|
| OLS, MPa | 12.9 | 2.17 | Low | 3.58 | 1.67 |
| Tensile Strength, MPa | 4.5 | 1.23 | 0.43 | 4.05 | 1.48 |
| Elongation at break, % | 3.7 | 51.1 | 30.4 | 6.3 | 25.1 |
| Modulus, MPa | 1287 | 6.3 | 27.0 | 731.6 | 18.97 |

TABLE 4

Tensile Properties after Aging

|  | Conditions | EX-2 | EX-3 | EX-4 | EX-5 |
|---|---|---|---|---|---|
| Tensile Strength, MPa | 90° C. for 1 hour | 1.23 | 0.43 | 4.1 | 1.5 |
|  | PR308.2 for 20 cycles | 1.83 | 0.6 | 4.05 | 1.3 |
| Elongation at break, % | 90° C. for 1 hour | 51.1 | 30.4 | 6.3 | 25.1 |
|  | PR308.2 for 20 cycles | 40.4 | 35.4 | 4.4 | 21.2 |

TABLE 5A

Thermal Conductivity

|  | EX-1 | EX-2 | EX-3 | EX-4 | EX-5 | CE-A |
|---|---|---|---|---|---|---|
| Filler | Alumina | Alumina | ATH | Alumina | Alumina | Alumina |
| Total Filler, wt. % | 79.6 | 85 | 80.2 | 85 | 89 | 89 |
| TC, w/mK | 1.04 | 1.57 | 1.39 | 1.44 | 1.94 | 0.87 |

TABLE 5B

Thermal Conductivity

|  | EX-6 | EX-7 | EX-8 | EX-9 | EX-10 |
|---|---|---|---|---|---|
| Filler | Alumina | Alumina | Boron Nitride | Boron Nitride | Boron Nitride |
| Total Filler, wt % | 89 | 79.4 | 49.0 | 49.0 | 59.9 |
| TC, w/mK | 1.92 | 1.07 | 1.06 | 1.07 | 1.32 |

TABLE 6

Flame Retardancy

|  | EX-1 | EX-2 | EX-3 | EX-4 | EX-5 |
|---|---|---|---|---|---|
| FR UL94 V0 | Fail | Fail | Pass | Fail | Fail |

TABLE 7

Dielectric Breakdown Strength and Resistivity

|  | EX-1 | EX-5 | EX-6 |
|---|---|---|---|
| Dielectric Breakdown Strength, kV/mm | 31.4 | 14.2 | 13.1 |
| Volume Resistivity (ohm-cm) | 6.4E+14 | 5.8E+14 | 9.6E+13 |

TABLE 8

Dielectric Constant and Loss Tan Delta

|  | Freq. (Hz) | Dielectric Constant | Loss Tan Delta |
|---|---|---|---|
| Example 8 | 1E+06 | 3.00 | 0.002 |
|  | 1E+03 | 3.03 | 0.003 |
| Example 9 | 1E+06 | 3.21 | 0.002 |
|  | 1E+03 | 3.25 | 0.004 |
| Example 10 | 1E+06 | 3.43 | 0.005 |
|  | 1E+03 | 3.60 | 0.021 |

TABLE 9

Glass Transition Temperature

|  | EX-3 | EX-5 | EX-7 | EX-8 |
|---|---|---|---|---|
| Curing Condition | 200° C. for 2 hours | 200° C. for 2 hours | 130° C. for 2 hours | 130° C. for 2 hours |
| Glass Transition Temperature, ° C. | 75 | 75 | 123 | 18 |

TABLE 10

| OLS at Elevated Temperature | |
|---|---|
| | EX-8 |
| Curing Condition | 130° C. for 2 hours |
| OLS at 140° C., MPa | 4.8 |

TABLE 11

| Density | | |
|---|---|---|
| | EX-8 | EX-10 |
| Filler (wt. %) | 49.0% | 59.9% |
| Filler (vol %) | 29.5% | 39.4% |
| Density | 1.32 | 1.40 |
| Density/filler wt. % | 2.7 | 2.3 |
| Density/filler vol % | 4.5 | 3.5 |

What is claimed is:

1. A battery module comprising a plurality of battery cells connected to a first base plate by a first layer of a curable composition comprising:
a cyclic olefin;
a ring opening metathesis polymerization catalyst; and
at least 40 wt. % of thermally conductive particles;
wherein the composition has a thermal conductivity of at least 1 W/M*K after curing.

2. The battery module of claim 1 wherein the thermally conductive particles are selected from the group consisting of alumina, alumina trihydrate, silicon carbide, boron nitride, aluminum nitride, graphite, zinc oxide, and a combination thereof.

3. The battery module of claim 1 wherein at least 20 vol. % of the thermally conductive particles have a particle size no greater than 10 microns.

4. The battery module of claim 1 wherein at least 10 vol. % of the thermally conductive particles have a particle size of at least 30 microns.

5. The battery module of claim 1 wherein the composition further comprises thermally conductive particles having an intermediate particle size ranging from greater than 10 microns to less than 30 microns.

6. The battery module of claim 1 wherein the cyclic olefin comprises a cyclic moiety with at least two carbon-carbon double bonds.

7. The battery module of claim 1 wherein the cyclic olefin comprises moieties selected from cyclopentadiene and oligomers thereof.

8. The battery module of claim 1 wherein the cyclic olefin further comprises a cyclic mono-olefin.

9. The battery module of claim 8 wherein the cyclic olefin further comprises alkyl norbornene.

10. The battery module of claim 1 wherein the cyclic olefin is present in an amount from 5 to 60 wt. % of the total composition.

11. The battery module of claim 1 further comprising an isocyanate adhesion promotor, a dispersant, a functional elastomer, or a combinations thereof.

12. The battery module of claim 11 wherein the isocyanate adhesion promotor is the reaction product of a polyol and methylene diphenyl diisocyante (MDI), where the polyol has one or more oxygen atoms in the backbone.

13. The battery module of claim 1 wherein the catalyst is a ruthenium or osmium metal carbene catalyst.

14. The battery module of claim 1 wherein the cyclic olefin is polymerized and the composition has one or more of the following physical properties:
i) a glass transition temperature of at least 70° C.;
ii) overlap shear adhesion to aluminum of at least 1, 2, 3, 4, or 5 MPa at 140° C.;
iii) dielectric constant of less than 4;
iv) a tan delta of less than 0.005; and
v) density/volume % filler of less than 5.5.

15. A method of bonding a battery module comprising:
providing a composition comprising:
a cyclic olefin;
a ring opening metathesis polymerization catalyst; and
at least 40 wt. % of thermally conductive particles;
wherein the composition has a thermal conductivity of at least 1 W/M*K after curing;
applying the composition between a plurality of battery cells and a first base plate; and
polymerizing the cyclic olefin.

* * * * *